(12) United States Patent
Jalbert et al.

(10) Patent No.: US 9,345,231 B2
(45) Date of Patent: May 24, 2016

(54) SELECTIVE ACCESS CONTROL APPARATUS FOR ANIMALS USING ELECTRONIC RECOGNITION

(71) Applicant: Vet Innovations, LLC, New Hartford, CT (US)

(72) Inventors: David Jalbert, Coventry, RI (US); David Saar, Titusville, NJ (US); Diane Eaker, Blooming Prairie, MN (US)

(73) Assignee: Vet Innovations, LLC, New Hartford, CT (US)

( * ) Notice: Subject to any disclaimer, the term of this patent is extended or adjusted under 35 U.S.C. 154(b) by 69 days.

(21) Appl. No.: 14/090,853

(22) Filed: Nov. 26, 2013

(65) Prior Publication Data

US 2015/0145644 A1    May 28, 2015

(51) Int. Cl.
*A01K 5/02*    (2006.01)
*G07C 9/00*    (2006.01)
*A01K 5/01*    (2006.01)
*A01K 11/00*   (2006.01)

(52) U.S. Cl.
CPC ............ *A01K 5/02* (2013.01); *A01K 5/0114* (2013.01); *A01K 11/006* (2013.01); *G07C 9/00111* (2013.01)

(58) Field of Classification Search
None
See application file for complete search history.

(56) References Cited

U.S. PATENT DOCUMENTS

| | | | |
|---|---|---|---|
| 5,992,096 A * | 11/1999 | De La Cerda et al. | 49/169 |
| 6,025,783 A | 2/2000 | Steffens, Jr. | |
| 6,700,547 B2 * | 3/2004 | Mejia et al. | 343/743 |
| 7,349,772 B2 | 3/2008 | Delaney et al. | |
| 7,458,336 B2 * | 12/2008 | Eu | 119/51.02 |
| 7,477,758 B2 | 1/2009 | Piirainen et al. | |
| 7,786,864 B1 | 8/2010 | Shostak et al. | |
| 7,889,096 B2 | 2/2011 | Breed | |
| 8,930,148 B2 * | 1/2015 | Huisma | 702/19 |
| 2009/0315704 A1 | 12/2009 | Rosing et al. | |
| 2011/0252684 A1 | 10/2011 | Ufer et al. | |
| 2011/0254665 A1 | 10/2011 | Lindsay et al. | |
| 2012/0092157 A1 | 4/2012 | Tran | |
| 2012/0139729 A1 | 6/2012 | Savarese et al. | |

FOREIGN PATENT DOCUMENTS

| | | |
|---|---|---|
| DE | 2302885 A1 | 9/2009 |
| EP | 2574023 A1 | 9/2011 |
| WO | 2008108816 A1 | 9/2008 |

OTHER PUBLICATIONS

Raphaeli, D. et al., "UWB Communication System with Pulse Interleaving Multiple Access for Active RFID", Microwaves, Communications, Antennas and Electronics Systems, 2009. COMCAS 2009. IEEE International Conference on, 2009, pp. 1, 5, 9-11.
Meng et al., "Design of Low-Power Active RFID Tag in UHF Bank," Control, Automation and Systems Engineering (CASE), 2011 International Conference on, 2011, pp. 1,4,30-31.
Cho et al., "An NFC transceiver using an inductive powered receiver for passive, active, RW and RFID modes," SoC Design Conference (ISOCC), 2009 International, 2009, pp. 456, 459, 22-24.

* cited by examiner

*Primary Examiner* — K. Wong
(74) *Attorney, Agent, or Firm* — Barlow, Josephs & Holmes, Ltd.

(57) ABSTRACT

A method and system is provided that controls access to various different locations and/or objects whereby animals wearing an ID tag are reliably and consistently allowed or denied access to various locations and/or objects, such as food contained within a food delivery device dish for example. An RFID system that employs a internally powered RFID tag with inductively coupled transmissions where a reader is employed linked to an internal multiple antenna array that is focused on all possible animal approach directions for a range of up to 36", but not more.

15 Claims, 7 Drawing Sheets

SELECTIVE ACCESS CONTROL APPARATUS FOR ANIMALS USING ELECTRONIC RECOGNITION

BACKGROUND OF THE INVENTION

The present invention relates to methods and systems for providing controlled access to various different locations and/or objects. More specifically, the present invention relates to an automated system whereby animals are tagged with an ID device are reliably and consistently allowed access to various locations and/or objects, such as food contained within a food delivery device dish for example.

Managing the amount of food an animal eats is a difficult task when multiple animals are required to be fed. Many feeding systems have been tried in the past including those that attempt to manage feeding through specific animal identification methods including using radio frequency identification. Failure to properly manage an animal's food intake can result in overweight and unhealthy animal. Currently more than 50% of companion animals in the United States are overweight.

Much of the prior art in companion food delivery devices utilizing an RFID system focus on the combination of RFID as a generalization combined with a specific food delivery device geometry such as a rotating cover, traditional pivoting doors, or an opening & closing drawer. These food delivery devices fail to perform due to a lack of understanding of the complexity physics of an RFID system and/or animal's natural habits and lack of high order reasoning capability and therefore have either never made it to market or fail to work properly in the marketplace.

In prior art RFID systems, the animal must either put its head in a box and or be in a specified area directly in front of the food delivery device for the system to work at all. Further due to the properties of these systems the orientation of the tag and other uncontrollable aspects of the environment can render the system nonfunctional in unpredictable ways for the animal. The resulting lack of function results in products not delivering the desired outcome of better food management. Increasing power to resolve this results in a significant cost increase to manufacture and/or possible issues with government regulations.

RFID systems are also well understood for use in large area and or large number of animals or objects. In order to meet the needs of large area coverage with consistent performance, these systems include multiple and diversely located antennas powerful transceivers and complex communication methods resulting in a very high cost system. Therefore there is a need for a system which is simple and low cost with an RFID system built into a unitary structure that can identify and manage the unique needs of multiple animal interaction with objects such as feeding devices, litter boxes, waterers, toys and other objects which an animal may interact with. The present invention relates generally to an improved radio frequency identification (RFID) system. More specifically, the present invention relates to a RFID access control system that reliably operates at a well defined medium range and low power in contrast to prior art RFID systems.

Generally, to date RFID applications generally operate in very short or very long range arrangements because the requirements for reliable communication at distances of about 3 feet is not something that the larger RFID industry has had to create operational system for. As a result, existing RFID applications are focused at either operational ranges of below 6 inches range or up to a hundred feet or more. Currently RFID systems with stringent functional requirements that operate between about 6 inches to about 3 feet are higher in cost and typically utilized in industrial applications.

In certain controlled access systems that rely in RFID, the RFID must be consistently read so that the product responds the same each time regardless of time of day, temperature in the room proximity to appliances either on or off. If the response is not consistent in an animal access system for example, then the animal will get mixed signals when trying to eat or not be allowed to eat. Inconsistency will cause problems for the animals. For example if an animal that is tagged to allow access to a food delivery device finds that sometimes it gets access and sometimes it does not then it will become confused and or aggravated and develop anxiety and further eating issues when the goal is to reduce eating issues. In a further example, if an animal is locked out of one food delivery device learns that it can occasionally beat the system because the system does not always sense it fast enough, it will keep trying to steal food. Conversely, if the system works nearly all the time then the animal will realize there is no reward and stop trying to steal food from that food delivery device and focus on the one to which it allowed access.

The problem is that in contrast to much of the prior art, the system must function in near to 100% of the covered space around the food delivery device (or other product) at a very high level of reliability, because if there is a null or dead zone resulting from poor antenna arrangement or nearness of a dish washer or other metal appliance which reflects the signal in a way not intended by the designer. The animal may find this poor coverage area and learn it can sneak up on the system and therefore steal food. Again once this happens it will continue to do this which reduces the effectiveness of the product.

Still further the RFID system must have sufficient range to allow the system to sense the animal approaching and open early enough so as not to make the animal wait for the food, but even more important again the system must sense the aggressive animal that is not supposed to get to the food in that food delivery device and close before it can steal the food.

Finally, the RFID system must not have too much range or it will sense animals that are waiting away from either their food delivery device or the one they are locked out of, or perhaps just walking by. If the food delivery device senses these tags outside of the immediate space around the food delivery device then it may cause problems for the animal that is eating at the food delivery device by the door closing then opening then closing.

There is therefore a need for an automatic system that controls access to an object or location when the assigned/tagged animal approaches while also recognizing all other animals in its proximity in order to limit access when those animals or people approach. It is a further object of the present invention to provide a system that controls access to an object or location in a manner that employs RFID technology such that constant and very reliable operation is achieved in a well-defined range of up to 3 feet with minimized false operation and interference.

BRIEF SUMMARY OF THE INVENTION

In this regard, the present invention provides a method and system provided that controls access to various different locations and/or objects. More specifically, in a preferred embodiment, the present invention provides an automated system whereby animals are tagged with an ID device are reliably and consistently allowed access to various locations and/or objects, such as food contained within a food delivery device dish for example.

In a first embodiment, the present invention is disclosed a powered RFID tag, such as battery assisted, solar powered, or other system that stores electrical energy within the tag making it internally powered. An alternative tag embodiment considers the tag to be powered, however the power is generated from a received signal when the tag receives a transmission from the feeder. The tag employs inductive or H field coupled resonance RFID transmissions. In such a system several frequency options are possible and may be selected based on country RF codes and or on frequencies which are not often used in a household environment. Within the food delivery device a high sensitivity receiver employs a multiple antenna array that is shielded against receiving electric field energy but instead uses magnetic field coupling with an active RFID tag for receiving its transmissions. The fundamentals of this are well defined in texts such as Design fundamentals and advanced techniques of RFID Antennas, Development and implementation of RFID Technology edited by Christina Turcu and Sungtek Kahg, and the RFID Handbook: Fundamentals and Applications in Contactless Smart Cards and Identification By Dr. Klaus Finkenzeller.

The antenna array covers all possible animal approach directions for a range of up to 36", but not more. The antenna array may also be located entirely in the body of the product.

To best manage the incoming signals the system employs a signal identification and filtering protocol that works with short duration (<20 msec) transmission times and pulsed transmissions at less than 2 second intervals. The receiver and tag both employ wire wound receiving/transmitting antennas. Optionally the tag may employ a ferrite core transmitting antenna. A possible addition would be the use of an accelerometer to maximize tag battery life and to randomize the start of the tag's message response, as to not having to transmit when an animal is in rest (sleeping and the like). To protect against stray RF signals H-field coupled RFID and antenna shielding is employed.

It should be noted by one skilled in the art that while the technology of the present invention is presented in the context of a preferred embodiment animal food delivery device dish such disclosure is meant only to be illustrative and is not intended to limit the scope of this invention to a particular configuration. It is also intended within the scope of the present invention that the method and system disclosed herein can be applied equally for controlling access to locations in the animal environment such as for litter boxes, animal watering systems (including circulating and outside of the house non circulating), animal toys, animal crates, animal gate access, animal doors, animal beds and animal containment systems. Accordingly, the general scope of the method and system are directed to access control technology and not to a specific embodiment. This provides a broad range of animal products that are improved in the context of the method and system of the present invention.

It is therefore an object of the present invention to provide an automatic system that controls access to an object or location when the assigned/tagged animal approaches while also recognizing all other animals in its proximity in order to limit access when those animals approach. It is a further object of the present invention to provide a system that controls access to an object or location in a manner that employs a well defined range, H-field coupled RFID technology such that constant and reliable operation is achieved with minimized false operation and interference.

These together with other objects of the invention, along with various features of novelty that characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention.

DETAILED DESCRIPTION OF THE INVENTION

Figure 1:
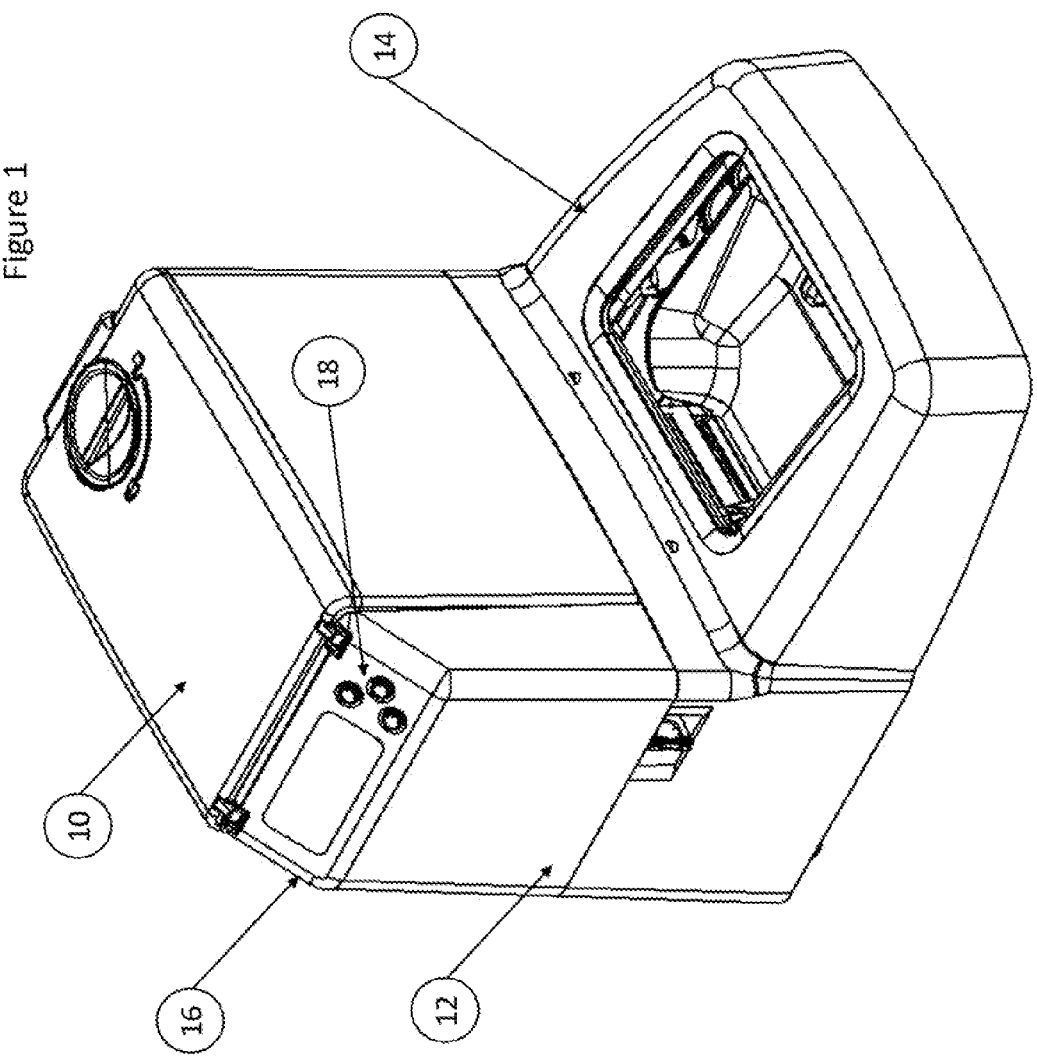
FIG. 1 is a front perspective view of an animal feeding dish in accordance with the teachings of the present invention.

Now referring to the drawings, a method and system is provided that controls animal access to various different locations and/or objects and more specifically, in the preferred embodiment, provides an automated system whereby animals wearing an authorized ID tag are allowed access to various locations and/or objects, such as food contained within a food delivery device dish for example, Animals wearing a non-authorized ID tag causes the device to close preventing access thereto by the animal(s).

In the most general embodiment, a system is provided for controlling animal access to locations or objects. The system includes a location or object to be controlled, a means for preventing animal access to said location or object and a sensor system configured and arranged to selectively disengage the means for preventing animal access. The sensor system includes at least one active tag that provides authorization to access the location or object wherein the at least one tag is preferably disposed on an authorized animal, a first sensor for controlling animal access by detecting, through H-field coupling RF communication, the presence of the tag and disengaging the means for preventing animal access and further detecting the presence of an animal other than the authorized animal and engaging the means for preventing animal access.

It should be noted by one skilled in the art that while the technology of the present invention is presented most generally as a system for controlling animal access to locations or objects and that the invention is illustrated in the context of several preferred embodiments, such disclosure is meant only to be illustrative and is not intended to limit the scope of this invention to a particular configuration. It is also intended within the scope of the present invention that the method and system disclosed herein can be applied equally for controlling access to feeding systems, litter boxes, animal watering systems (including circulating and outside of the house non circulating), animal toys, animal crates, animal gate access, animal doors, animal beds and animal containment systems. Accordingly, the general scope of the method and system are directed to the animal identification and access control technology and not to a specific embodiment. This provides a broad range of animal products that are improved in the context of the method and system of the present invention.

Turning now to FIG. 1, which specifically illustrates an animal food delivery device 10. The food delivery device 10 can be seen to include a housing 12 that includes a compartment 16 therein and electronics 18 for controlling the overall system. A base portion 14 covers the antenna array as shown in FIG. 3.

Figure 2:
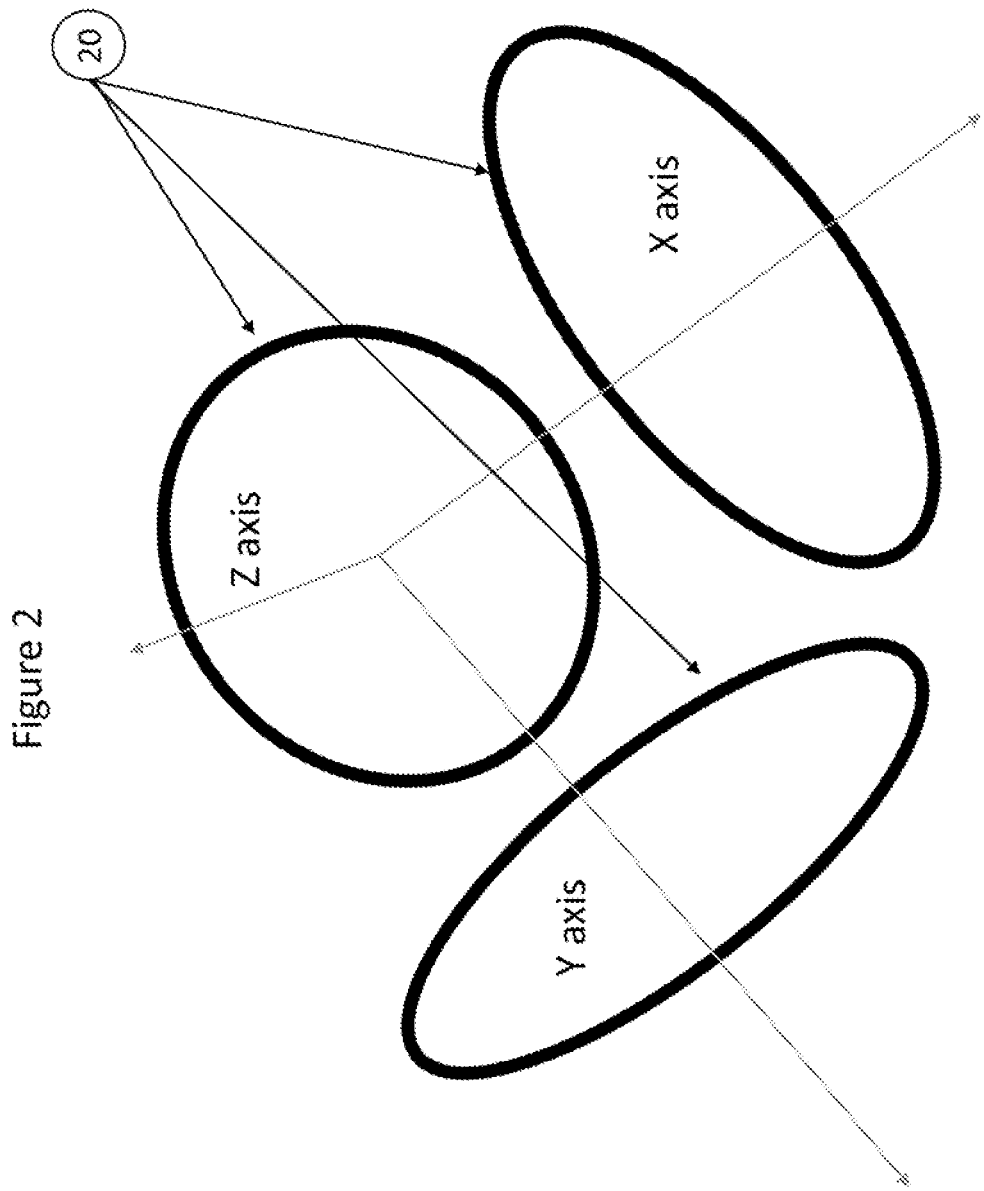
FIG. 2 is a perspective view showing a 3 antenna array where each antenna is aligned to one of each of a 3 dimensional axis system.

Turning now to FIG. 2, one embodiment employs a multiple antenna array that has one antenna aligned to each axis of a standard 3 dimensional set of orthogonal set of axes. This antenna array and connected receiver is combined with RFID tagging FIG. 4 for a rapid response and well defined range system. A long life battery assisted tag may be in any orientation and location within 3 feet of the device, but the low power RFID signal must be received with very high reliability to ensure that the system responds in a consistently repeatable manner so as not to confuse/frustrate the animal. To do this a custom low cost system has been developed whereby an antenna array is incorporated to reliably cover the three dimensional space that the tag 200 will appear in when an animal approaches the object. In contrast to the prior art wherein a one antenna arrangement may be approached from a direction of poor reception capability as is common with many RF antennas thereby missing the signal, an antenna array is provided. Preferably an antenna is placed in each of three orthogonal planes in three dimensional space.

Figure 3:
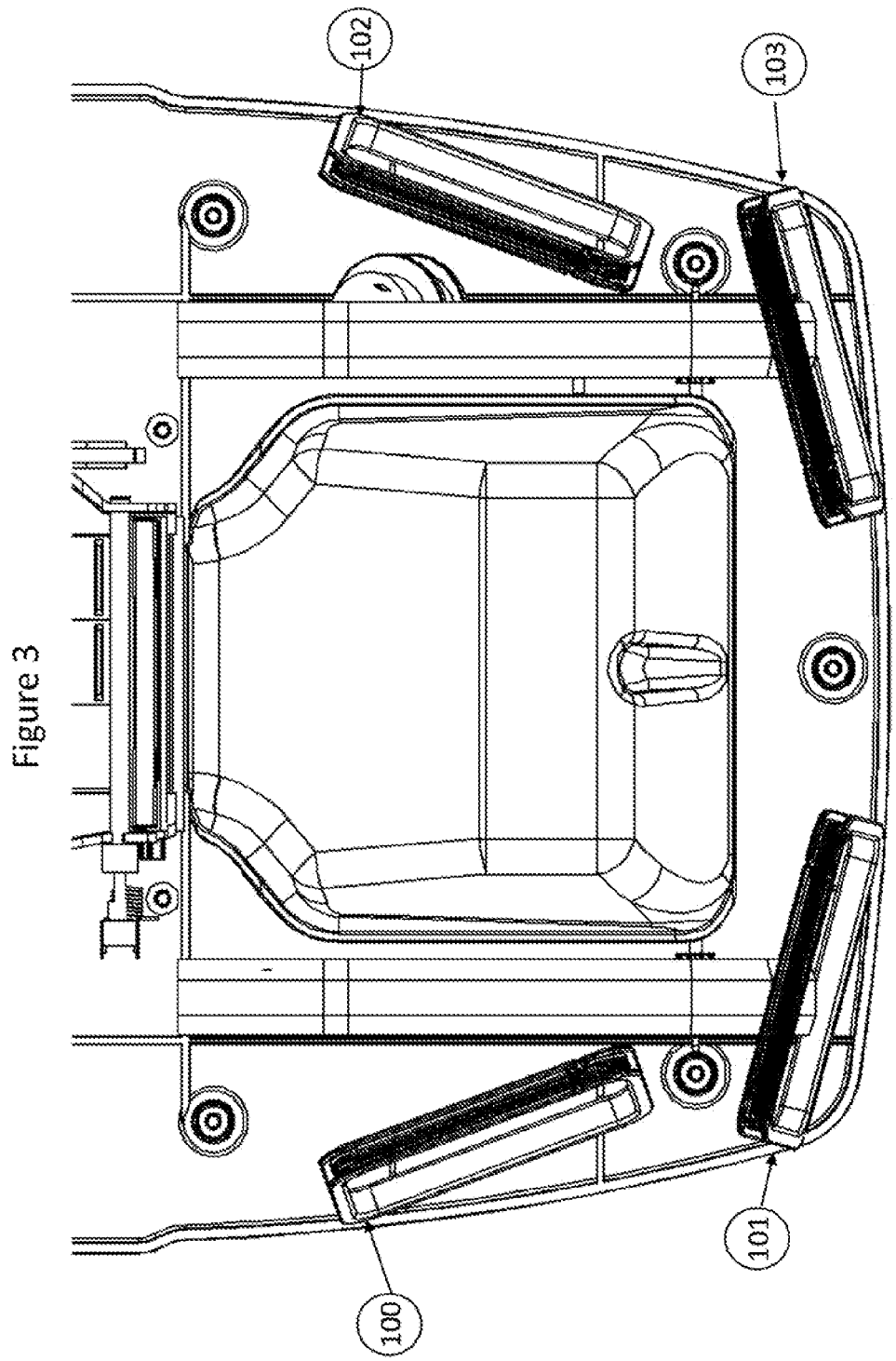
FIG. 3 is a top view of the antenna of an animal feeding dish.

Turning now to FIG. 3, more preferably, the antennas 100, 101, 102, 103 are oriented to best detect the directions which an animal approaches the food delivery device, i.e. biased vertically and towards the front and forward sides of the food delivery device. Preferably the antenna array employs 2, 3 or four antennas arranged where at least 2 are close to orthogonal angles to one another. In one arrangement an array is provided consisting of at least 2 antennas where an included angle between them is of not less than 60 degrees and not more than 120 degrees. The antennas may be wire wound, ferrite core, or on a printed circuit board.

It has been seen that higher frequency electrical RF energy has issues with signal bouncing that can then result in either destructive or resonant signal interference or additive range increases. In order to overcome the above noted problems, the present invention deploys a lower RF frequency and inductive or H-field coupling between the tag and antenna array. Once frequencies enter the VHF range, RF energy has issues with being absorbed by living tissue due to the high water content of such tissue. Deploying lower frequency H-field communication (near field) solves the problem of tissue absorption. H-field communication also provides better control over the range of operation of the device. H-field signals decay at 1 over the cube of the distance as compared to RF which decays at 1 over the square of the distance thereby giving a much more finite control over the range of the system to protect against false detections resulting in a well defined range of functionality targeted for up to 3 feet from the product.

Figure 7:
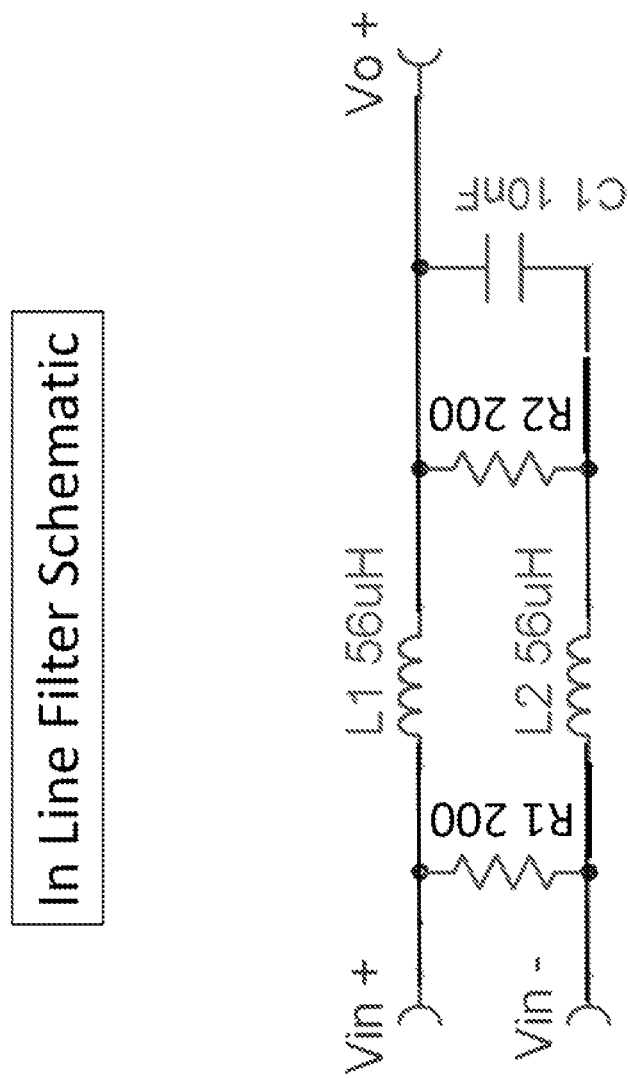
FIG. 7 is a schematic view of a typical power filter circuit.

Due to the low power at which the system operates a well understood filter method such as that shown in FIG. 7 may prevent line noise from entering the system. In one embodiment of the invention there is a DC power filter to clean the power before it enters the food delivery device electronics. The purpose of this filter is to attenuate noise conducted along the wires from the power supply to the food delivery device. This noise can be from either a wall adapter and its cord, an AC power line to which the wall adapter is connected or from nearby radiating noise sources that create antenna noise current in the power wiring, which could also include power wiring from a battery power supply located either internal or external to the product. Further, a multipoint background noise level filter going on and updating the background noise level all the time such that an incoming transmission is more readily identified.

Figure 4:
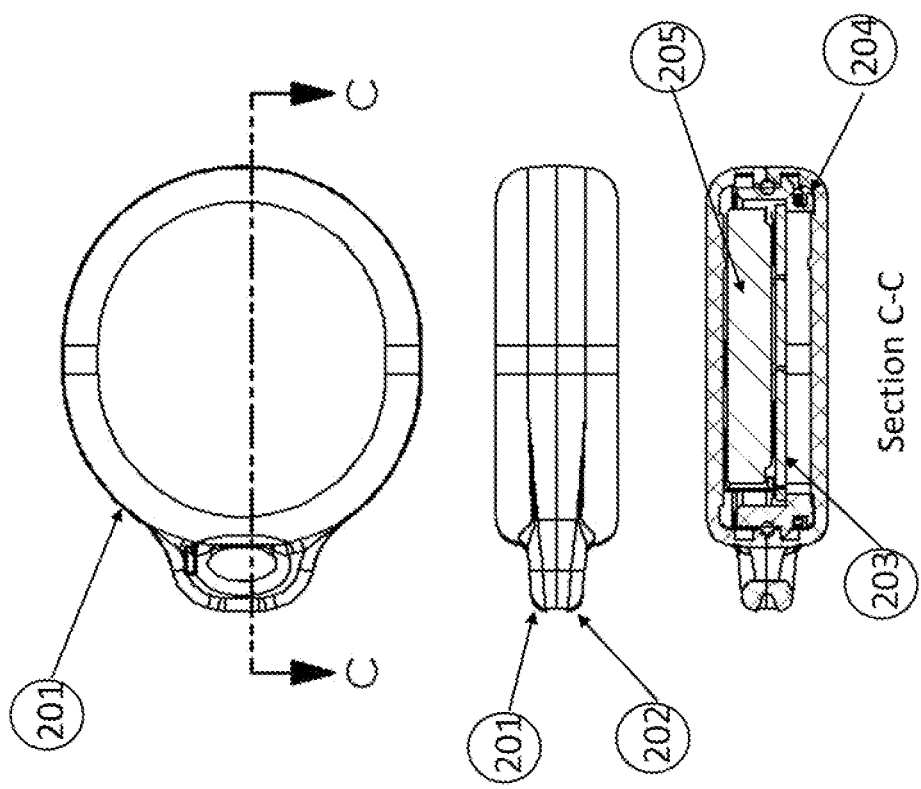
FIG. 4 is a grouping of tag views including a section view.

Turning now to FIG. 4, one embodiment of the tag of this system can be seen 200. The enclosures 201 and 202 enclose and protect the power source sown as a coin cell 205 typical of small low power devices, and the tag board 203 and coil antenna 204.

The system may operate in one of two ways, (1) the tag is transmitting at a periodic time all the time, perhaps at less than 2 seconds intervals and the receiver in the food delivery device simply listens, or (2) the tag is quiet until receiving a wakeup call from a base transceiver in the food delivery device at which point the tag responds and transmits periodically as defined above until the animal is out of the transmission range at which point it goes quiet again. In this embodiment the wakeup call may also provide the energy to power the tags transmission. Tag transmissions have been designed to each have different interval timing between responses to prevent multiple tags from "synchronized colliding" with each other, which would be a possibility if each tag had a fixed wait time. The wait time between tags is randomized by component uncertainty in the watch dog timer, as well as a deliberately programmed randomization in the tag response timing derived from the five LSB bits as present in the tag's unique Id field, yielding 32 different variations in tag response time. In addition, the tag's response timing is also randomized by the uncertainty for the tag wakeup once the tag's accelerometer has been activated.

Figure 5:
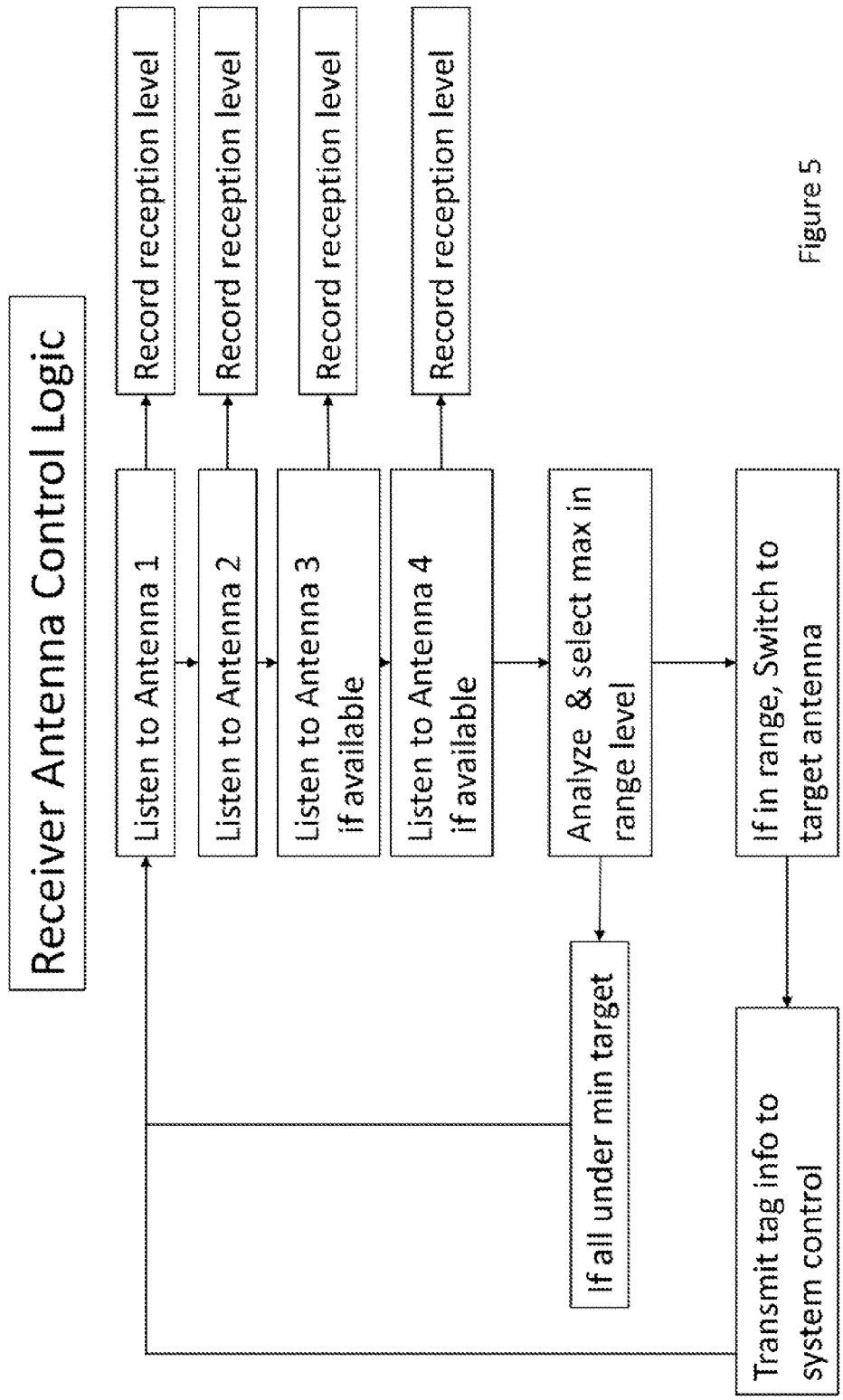
FIG. 5 is a flow chart of one mode for antenna scanning and selection logic.

In one embodiment, a tag is established as authorized or non-authorized at initial set up of the logic system. As shown in FIG. 5, the logic for one embodiment is as follows, the receiver system is listening at each antenna for short durations by switching through each antenna individually for less than a millisecond each. The system temporarily stores the reception level energy of the received signal for each antenna. (It is subsequently overwritten by the next time based energy level for that antenna). In either case, when there is reception of signal above the background level by a certain predetermined amount the system evaluates the recorded energy level for each antenna in the array.

Figure 6:
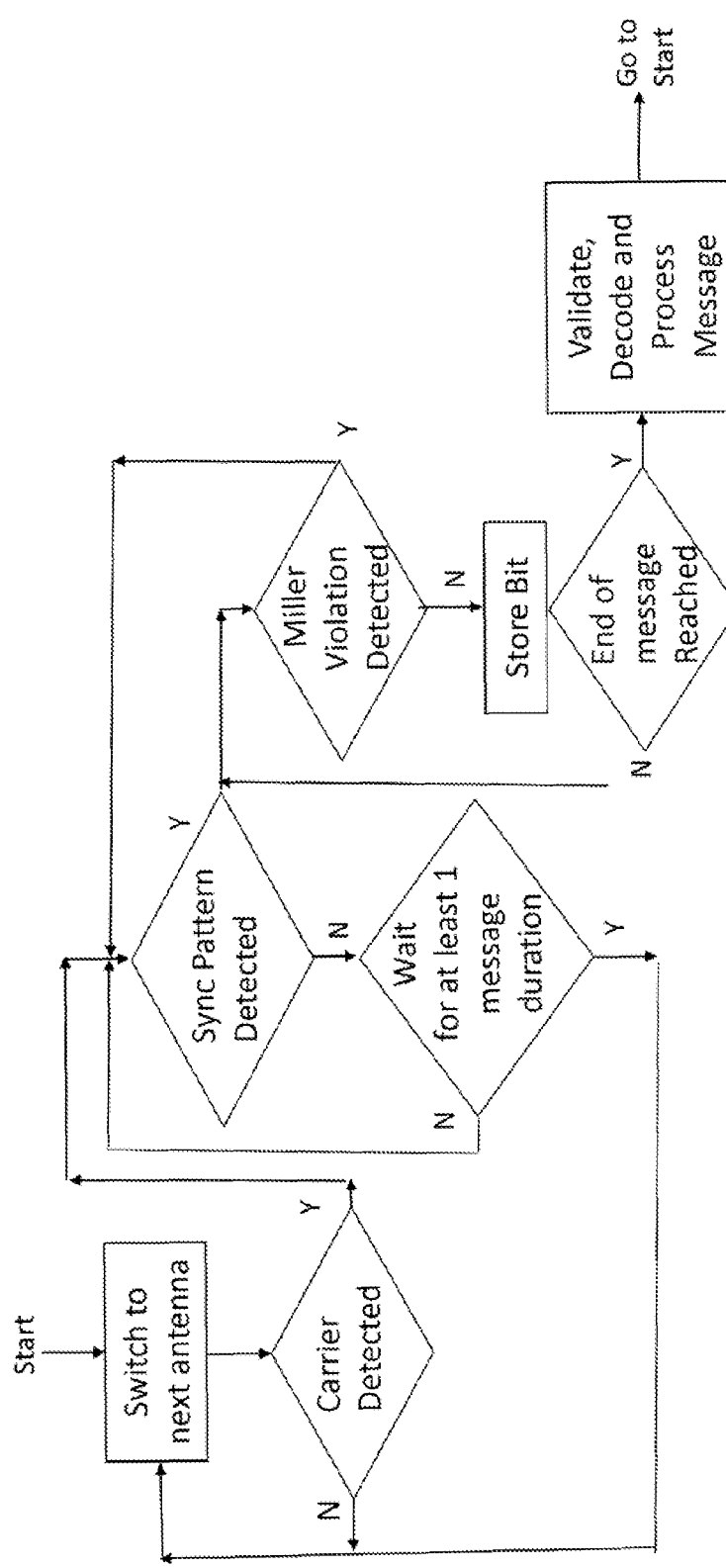
FIG. 6 is a flow chart of an alternative mode for antenna scanning and selection logic.

As a tagged animal approaches the food delivery device, the system determines if the tag is authorized. If an authorized tag is present, the door opens to allow the animal access to the food contained therein. The system evaluates that signal level by the logic. In doing so the system scans during the transmission preamble targeting the antennas having good reception signal strength. In this way the reception energy is used to target and select an optimum reception situation. Once the best option antenna is established the system switches to that antenna, leaving all other antennas in the array and receives the balance of the signal from that best option antenna. The system then confirms if the transmission is a valid or non-valid transmission and if the tag is accepted or rejected In an alternative embodiment, as soon as a signal is detected the system checks for an entire tag message per antenna scan interval. The received tag message is then validated by the system by matching the tag message CRC (Cyclic Redundancy Check) with the actual received tag data. If found OK by the reader software (meaning the tag message was received without errors), the particular received tag message is then stored by the system. After a signal is detected on a certain antenna, the antenna scanning dwell time is extended to at least one message duration to guarantee detecting the start of a message and to remain there until at least one full message is received before switching to the next antenna (which is dictated by the asynchronous nature between actual antenna scan interval and the start of the tag transmission). One method for the logic for progression in this alternative embodiment is shown in the event flow diagram in FIG. 6.

This alternative scanning method allows for shorter and thus faster messages as well as multiple consecutive message transmissions. FIG. 7 illustrates the shorter duration message. The extended dwell time can be tailored to either receive a certain number of messages and switch to the next antenna or to read the maximum number of messages per transmission burst. The system software can then determine at which antenna the tag was read the most (by doing a tag read tally per antenna). This antenna will then have a high probability of being the one to which the particular tag is the closest in terms of vicinity and that way have a high reliability of receiving the transmissions.

Since the antennas are arrayed in a pattern that both targets the 3D space of the primary approach path while also covering much of the orthogonal orientations, the system is therefore optimized to make the best use of a very low power system for maximum sensitivity while also requiring the cost and complexity of only one receiver. To do this the tag sends its transmitted message at intervals of less than 2 seconds for a duration of less than 20 ms as a combination of items in a predetermined order. The transmission is first the preamble which is what the receiver uses to identify power level and ideal antenna.

In a further embodiment, the system could transmit the amount of time an animal was active and or the time/intensity of activity as picked up by the accelerometer in the tag currently used to shut off the tag when the animal is inactive to save on battery life. It should be mentioned, that the transmission time frame is preferably less than 20 ms and is more preferably less than 10 ms.

It can therefore be seen that the present invention provides an automatic system that provides selective control and access to other various locations and objects such as animal related items like food delivery devices, litter boxes, animal watering systems including circulating and outside of the house non circulating, animal toys, animal crate and gate access, animal doors, animal beds, and animal containment systems in a relatively less complex and cost-effective in regard to its use and operation. For these reasons, the present invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A system for controlling animal access to an animal system comprising:
an animal system to be controlled;
a means for preventing animal access to said animal system; and
an antenna system comprising at least two separate, non-coplanar antennas covering up to 3 dimensions and shielded against RF signals for detecting the presence of a tag using inductive or H-field coupling of the signal; and
an authorized powered RFID tag configured to magnetically couple with said antenna system,
wherein a control system scans the antenna system for the transmission of a tag in proximity to said animal system and upon sensing an authorized tag disengages said means for preventing animal access.

2. The system of claim 1, wherein said means for preventing access is reengaged when a tag other then said authorized tag is detected.

3. The system of claim 1, wherein said antenna system includes at least two antennas arranged substantially orthogonal relative to one another.

4. The system of claim 1, wherein said antenna system includes at least three antennas arranged substantially orthogonal relative to one another.

5. The system of claim 1, wherein said antenna system includes at least two antennas arranged in a manner that biases them towards an animal approach direction.

6. The system of claim 1, wherein said antenna system is located within the body of the product.

7. The system of claim 1, wherein the control sequentially scans each antenna within said antenna system to detect a signal above a background noise signal.

8. The system of claim 6, wherein said control chooses one of said antennas in said antenna system based on a signal strength of said detected signal, said control, upon detecting an optimum signal strength as said one antenna no longer polling the remaining of said antennas.

9. The system of claim 6, wherein said control chooses one of said antennas in said antenna system based on the transmitted data, said control, upon detecting the correct transmitted data as said one antenna no longer scanning the remaining of said antennas.

10. The system of claim 1, wherein said tag is powered by a received signal.

11. The system of claim 1, wherein said tag has an internal power supply.

12. The system of claim 1, further comprising a noise filter on the power feeds to said control system to filter ambient noise from reaching said RF system.

13. The system of claim 1, wherein a single control circuit is employed to monitor each antenna within said antenna system.

14. The system of claim 1, where an electronic RFID tag has a randomized transmission time interval determined by a set of LSB bits as present in the tag's unique ID data field.

15. The system of claim 1, where an electronic RFID tag wakes up by means of an accelerometer or other means of motion detection, for reasons of battery conservation.

\* \* \* \* \*